UNITED STATES PATENT OFFICE.

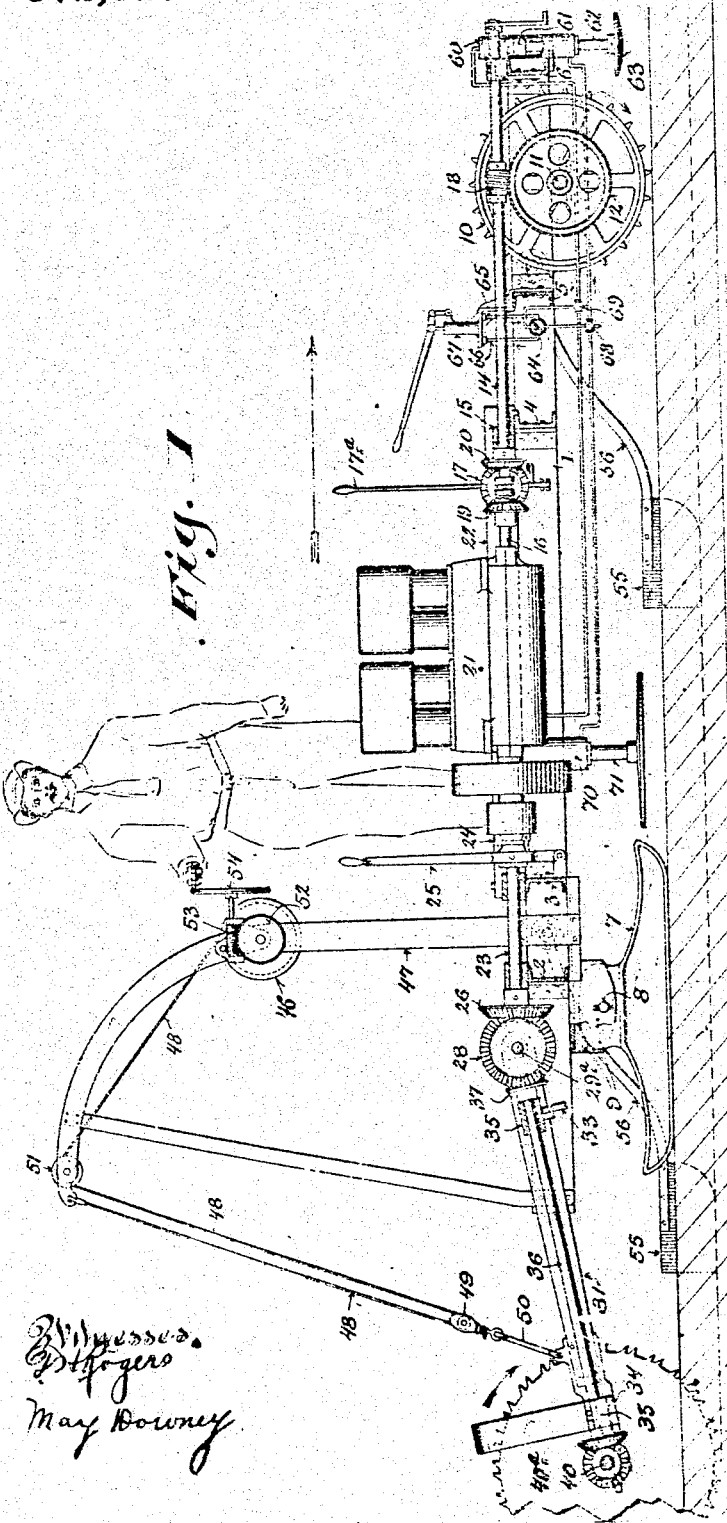

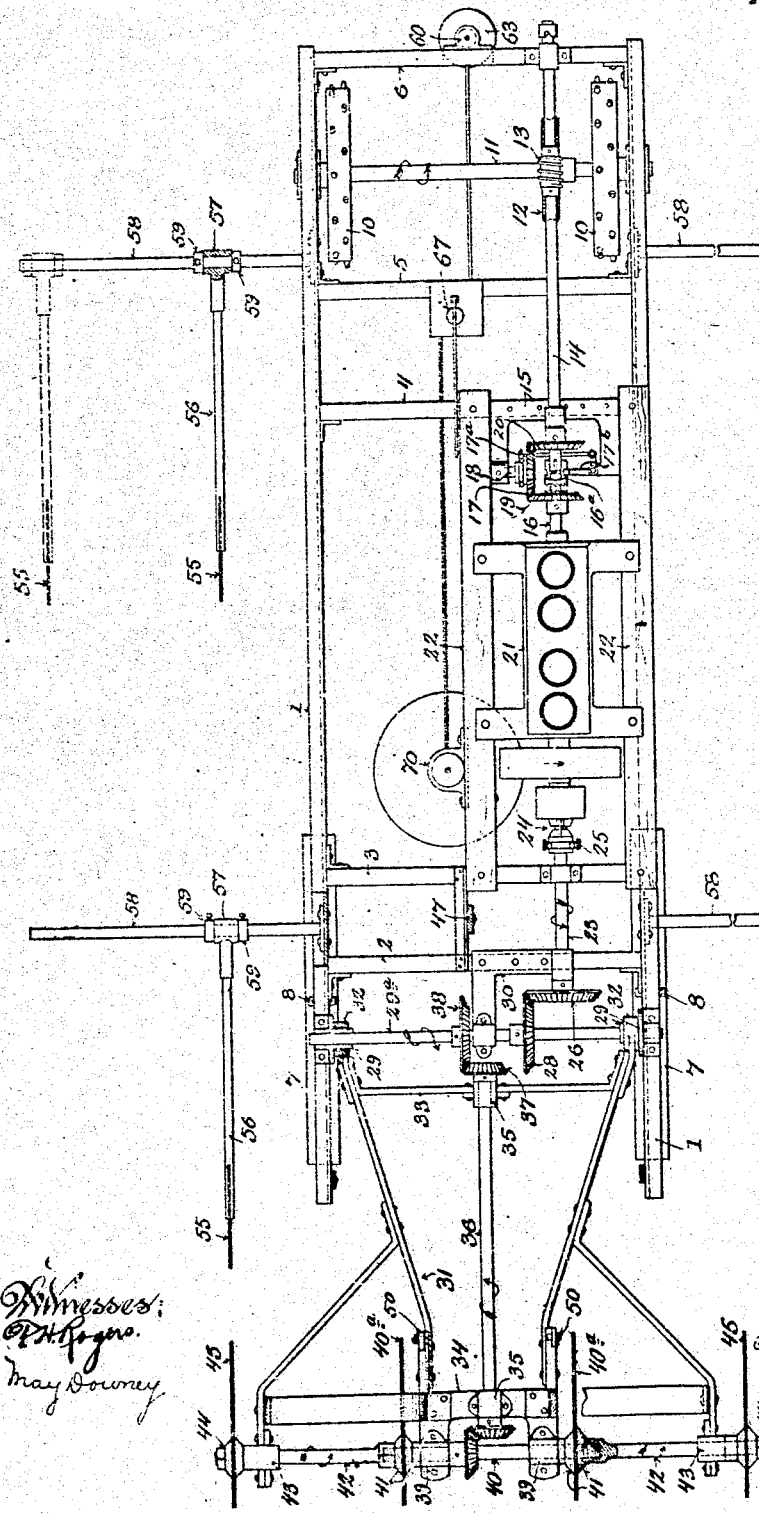

THOMAS DIAMOND, OF WAUKESHA, WISCONSIN, AND WILLIAM P. DIAMOND, OF CLEVELAND, OHIO.

ICE-HARVESTER.

972,517.  Specification of Letters Patent.  Patented Oct. 11, 1910.

Application filed April 21, 1910. Serial No. 556,762.

*To all whom it may concern:*

Be it known that we, THOMAS DIAMOND and WILLIAM P. DIAMOND, both citizens of the United States, and residents, respectively, of Waukesha, in the county of Waukesha and State of Wisconsin, and of Cleveland, in the county of Cuyahoga and State of Ohio, have invented certain new and useful Improvements in Ice-Harvesters; and we do hereby declare that the following is a full, clear, and exact description thereof.

Our invention relates to self-propelled ice-cutting machines and has for its primary object to provide a simple, economical and easily manipulated machine, the invention being especially applicable to machines of the character such as patented by T. Diamond, No. 877,916, dated February the 4th, 1908.

A further object of our invention is to provide an efficient gear connection between the motor, ice-cutting saws and traction-wheels; to provide an adjustable suspension device for the series of saws and saw guides; to provide a fluid jack mechanism for raising and lowering the machine preparatory to turning the same for a return cut; to provide a rigidly constructed truck-frame, and oscillatory supporting runners for the rear end of same.

With the above and other objects in view, the invention consists in certain peculiarities of construction and combination of parts as hereinafter set forth with reference to the accompanying drawings and subsequently claimed.

In the drawings Figure 1 represents a longitudinal sectional elevation of an ice harvester embodying the features of our invention, and Fig. 2, a plan view of the same with parts broken away and parts in section to better illustrate certain structural features.

Referring by characters to the drawings, 1, 1, indicate longitudinal beams of a truck-frame connected by transverse beams 2, 3, 4, 5 and 6. The truck-frame is supported at its rear end by oscillatory runners 7, ear extensions of which runners are fulcrumed upon pintles 8, the ears being fitted between depending leaves 9 of brackets that are secured to the lower face of the beams 1, the said leaves serving as supports for the pintles. By this construction each runner is held rigid against lateral or side play and is capable of oscillatory movement independent of its companion runner. The forward end of the truck is supported upon spudded traction-wheels 10 that are mounted upon an axle 11, which is journaled in suitable bearings secured to the lower side of the longitudinal truck-beams. The axle has also mounted thereon a worm-wheel 12 that is meshed with a worm 13 secured to a shaft 14, which shaft is journaled at its rear end in a bearing of a bracket 15 that is fast to the transverse beam 4, the front end of the shaft being journaled in a bearing secured to the transverse beam 6. This shaft is axially alined with a motor shaft 16, the shafts being connected by any type of reversing clutch mechanism. In this instance the reverse clutch mechanism shown consists of a beveled pinion 17 that is loosely mounted upon a stud 18, which is fast in a boss of the bracket 15, the beveled pinion being provided with a grooved hub for engagement with a shifting lever 17$^a$. The beveled pinion 17 is adapted to mesh with corresponding pinions 19 and 20 respectively secured to the motor shaft 16 and shaft 14, which shafts abut each other midway between said pinions. Beveled pinion 19 is provided with a clutch faced hub that is adapted to be engaged by a corresponding clutch face of a coupling collar 16$^a$, the said collar being loosely mounted upon the end of the motor shaft and in spline connection with shaft 14. The coupling collar 16$^a$ is annularly grooved for the reception of one arm of a bell crank 17$^b$, its other arm being linked to the shifting lever 17$^a$. When the clutch mechanism is in the position shown in Fig. 1, motion is transmitted from the motor shaft to shaft 14 in a reverse direction by the idle pinion 17. Should the lever 17$^a$ be shifted, the idle pinion 17 will be drawn out of mesh with pinions 19 and 20 and simultaneously the coupling collar 16$^a$, through its connection with said lever, will be shifted to cause a direct coupling connection between the two shafts through engagement of the clutch faces of beveled pinion 19 and said coupling collar, whereby motion is imparted to shaft 14 in the same direction as that of the motor shaft. By this arrangement it is obvious that the forward or backward movement of the machine may be controlled by the operator or the same may be disconnected from the motor.

The motor 21, in this instance, is illustrated as being of the internal combustion type and is mounted upon longitudinal sills 22, that are supported and secured to the transverse beams 3 and 4 of the truck-frame. Just rearward of and alined with the motor-shaft is located a transmission-shaft 23, and between the motor-shaft and transmission-shaft there is provided a friction clutch 24, which clutch is controlled by lever 25, whereby power from the motor may be imparted to said transmission-shaft at the will of the operator, the latter shaft being journaled in bearings that are secured to the transverse beams 2 and 3. The transmission shaft has secured to its rear end a beveled gear-wheel 26, which gear-wheel meshes with a similar beveled gear-wheel 28, that is secured to a transversely disposed counter-shaft 29$^a$. The counter-shaft 29$^a$ is revoluble in bearings 29 and an intermediate bearing that is carried by a bracket 30, which bracket is secured to the transverse beam 2. The bearings 29 have inwardly extending portions upon which are loosely mounted ear-extensions 32 of a saw-carriage 31, which saw-carriage is thus rendered capable of oscillatory movement upon said bearing extensions. The saw-carriage 31 is composed of suitably arranged longitudinal struts connected and braced by transverse struts 33 and 34, which struts carry boxes 35 for a drive-shaft 36. The forward end of this drive-shaft has secured thereto a beveled pinion 37, which meshes with a beveled gear-wheel 38, that is secured to the counter-shaft 29$^a$, upon the axis of which the saw-carriage is pivoted. By this arrangement the saw-carriage may be raised or lowered without affecting the gear connection between the drive-shaft 36 and counter-shaft 29$^a$, from which counter-shaft the drive-shaft receives its motion.

Extending rearwardly from the transverse strut 34 of the saw-carriage are bearings 39, in which is mounted a transversely disposed saw-arbor 40. This saw-arbor is in miter-gear connection with the drive-shaft 36 and has mounted upon its opposite ends circular saws 40$^a$, the saws being locked to the shaft by suitable disks 41, which disks are held against the saws by means of supplemental saw-arbors 42, the ends of the saw-arbors being slightly enlarged with a hexagon contour and provided with internally threaded recesses for engagement with threaded ends of the saw-arbor 40. The outer ends of the supplemental arbors are journaled in bearings 43, which extend from the saw-carriage, the said arbors being provided with threaded ends for the reception of locking-nuts 44, which nuts, in connection with washers, serve to secure saws 45 in position upon said supplemental arbors.

From the foregoing described arrangement of mounting the saws upon a sectional arbor it will be seen that the inner pair of saws may be readily removed for repairs without removing the entire mechanism. This is accomplished by disconnecting the supplemental arbor at its threaded end with the main arbor 40, whereby the saw may readily be removed.

The saw-carriage is raised and lowered from its working position by means of a windlass 46 that is supported upon a crane 47, which crane is secured to the truck and suitably braced. The overhanging end of the crane has connected thereto one end of a cable 48, which cable extends downwardly and through a pulley 49, that is connected to the saw-carriage by means of a bail 50. The cable extends upwardly from the pulley and is guided over an idle pulley 51, that is trunnioned upon the crane, from which pulley the cable extends and is connected to the windlass. Motion is imparted to the windlass through a worm-wheel 52 that is fast on the windlass shaft, the worm-wheel being meshed with a worm 53, the end of which carries a hand-crank 54. By this mechanism the operator may readily raise or lower the saws, it being understood that, owing to the worm gear, the cable will hold said saws in any desired position of adjustment, whereby complicated locking mechanism is dispensed with.

As shown in the drawings, the machine is equipped with four saws and is capable of cutting a corresponding number of sections of ice and in its operation, in order to gage the cutting of the saws from the last kerf, the machine is provided with one or more guide-shoes 55. These guide-shoes are riveted or otherwise secured to arms 56, which arms terminate with hubs 57, that are loosely fitted upon rods 58. The machine, as shown in Fig. 2, is provided with pairs of these rods upon opposite sides, each rod being secured by rivets or otherwise to the truck-beams 1. The hubs 57 of the guide-shoes are held in their adjusted position upon the rods by means of their set collars 59, said set collars being arranged to lock the guide-shoes after the same have been adjusted within the saw-kerf, and, as shown in dotted lines in Fig. 2, when the machine is operating with four saws, the guide-shoes are adjusted laterally to a width from the outer saw which is equal to the distance between saws. Should there only be two saws operating, the other saws, it is understood, would be removed and the saw-guides would be in a position as shown in full lines of Fig. 2. The rods are placed upon opposite sides of the machine in pairs for the purpose of cutting either from left to right or right to left as the case may require.

By utilizing a saw-guide or guides as just described it will be seen that the same will trail within the saw-kerf and are capable of oscillation, whereby they may ride any irregularities within said kerf while at the same time they will securely hold the machine in a position parallel to the last kerf.

In order to turn the machine about with the least possible expenditure of power and time after the same has completed a cut, we have provided a fluid-controlled jack, whereby the traction-wheels of said machine may be lifted from the surface of the ice or, in some instances, the machine may be entirely suspended. In cases where it is only required to lift the traction end of the machine we utilize a forward fluid jack, which, in this instance, comprises a cylinder 60 that is secured to the transverse beam 6. This cylinder has mounted therein a piston head 61, from which head a piston rod 62 extends downwardly through a suitable gland in the lower end of the cylinder, the piston rod being provided with a disk 63 at its lower end for engagement with the surface of the ice. The upper and lower ends of the cylinder are in pipe connection with a valve 64, which valve is connected by a discharge pipe 65 and a return pipe 66 to a hand-controlled fluid pump 67, the pipes 65 and 66 being provided with suitable check-valves (not shown) within the pump-base. By this mechanism when the valve 64 is set in the position shown in Fig. 1 and the pump operated, oil or other fluid will be forced through the discharge pipe 65 to the valve 64 and from thence to the lower end of the cylinder 61, whereby the piston, which comprises the jack mechanism, is lifted and held clear of the surface of the ice. Should the operator desire to lift the traction-wheels, valve 64 is reversed and the pump discharge pipe 65 will then draw the liquid from the bottom of the cylinder and circulate it through the pipe system to the top of said cylinder, whereby the jack will raise the forward end of the machine. The fluid circulating pipes are provided with three-way-cocks 68 and 69, and said circulating pipes, in this instance, are shown extending rearwardly from said three-way-cocks to the top and bottom of a cylinder 70. This cylinder is in every respect similar to the one just described in connection with the forward jack and is so placed with relation to the machine that the weight of the same is balanced upon its piston 71 when the latter has been forced downward. The said piston 71 also carries a disk, which, when resting upon the ice, serves as a support for the entire machine and the same may thus be revolved about the axis of the piston with the least possible power, it being understood that when the centrally disposed jack is operated the three-way-cocks 68 and 69, are adjusted so as to cut off the fluid supply from the forward jack.

From the foregoing description it will be understood that the machine as described is under perfect control of a single operator and, owing to the novel structural features and combination of parts, it is capable of cutting a maximum quantity of ice in a given time with the least expenditure of power, the said results being attained by actual test of a full-sized machine in operation.

By utilizing a speed reducing gear drive in connection with the traction wheels, which gear, in this instance, consists of a worm and worm-wheel, the machine is timed to feed forward at a speed which does not offer undue resistance to the saws, the rotation of which saws is at high velocity, being geared up to a speed approximately twice that of the engine, and thus the saws are capable of performing their cutting operation in unison with the forward travel of the harvester, it being understood that all gearing shown exposed in the accompanying drawings is suitably incased to provide against accidents and also protect the same from weather conditions.

We claim:

1. An ice harvester comprising a truck, an axle mounted upon the forward end of the truck, spudded traction wheels secured to the axle, independent oscillatory runners mounted upon the rear end of the truck, an engine carried by the truck having its shaft extended longitudinally in either direction, an axially alined shaft extending forwardly from the engine shaft, a clutch mechanism for connecting said engine shaft and forward shaft, a speed reducing gear connection between the aforesaid forward shaft and truck axle, a transmission shaft axially alined with and extending back from the aforesaid engine shaft, a clutch mechanism for connecting the engine shaft and transmission shaft, transversely disposed bearings secured to the truck, a counter-shaft journaled in the bearings, a swinging saw-carriage mounted upon said bearings, a longitudinally disposed drive shaft carried by the saw-carriage, beveled driving gears connecting the transmission-shaft, counter-shaft and drive-shaft, a transversely disposed saw-arbor journaled in said saw-carriage, beveled gears connecting the saw-arbor and drive-shaft, one or more saws carried by the saw-arbor, a crane supported upon the truck, a windlass mounted upon the crane, a cable connecting the windlass and saw-carriage, a hand-controlled worm driving gear for the windlass, a jack mechanism for the truck, and oscillatory trailing guide shoes carried by the truck adapted to travel in the last saw-kerf, whereby the succeeding saw-kerf is gaged.

2. An ice harvester comprising a truck, an axle mounted upon the forward end of the truck, spudded traction wheels secured to the axle, independent oscillatory runners for supporting the rear end of the truck, an engine mounted upon the truck having its shaft extending longitudinally in either direction, a speed reducing gear connection between the forward shaft and truck-axle, a transmission shaft axially alined with and extending rearwardly of the aforesaid engine shaft, a clutch mechanism for connecting the engine shaft and transmission shaft, bearings carried by the truck, a counter-shaft journaled in the bearings, a swinging saw-carriage mounted upon the bearings, a transversely disposed sectional arbor mounted upon the swinging saw-carriage, a driving gear connection between the arbor, counter-shaft and transmission shaft, one or more saws carried by each section of the saw-arbor, a crane mounted upon the truck, a windlass carried by the crane, and a cable connection between the windlass and saw-carriage.

3. An ice harvester comprising a truck, an axle mounted upon the forward end of the truck, traction wheels secured to the axle, independent oscillatory runners for supporting the rear end of the truck, an engine carried by said truck having its shaft extending longitudinally in either direction, an axially alined shaft extendng forwardly of the engine shaft, a hand-controlled reversing gear mechanism connecting the forward shaft and engine shaft, a worm-wheel secured to the axle, a worm carried by the forward shaft engageable with the worm-wheel, a transmission shaft axially alined with and extending rearwardly of the aforesaid engine shaft, a clutch mechanism connecting the engine shaft and transmission shaft, transversely disposed bearings carried by the truck frame, a counter-shaft journaled within the bearings, a swinging saw-carriage mounted upon the bearings, a longitudinally disposed drive shaft carried by the saw-carriage, beveled driving gears connecting the transmission shaft, counter-shaft and drive-shaft, a transversely disposed saw-arbor mounted upon said saw-carriage, gears connecting the saw-arbor and drive-shaft, one or more saws carried by the saw-arbor, a crane supported upon the truck, a windlass mounted upon the crane, a cable connecting the windlass and saw-carriage, a vertically disposed cylinder secured to the truck-frame, a piston mounted within the cylinder having a disk at its end adapted to engage the surface of the ice, and a hand-controlled fluid pump in pipe-connection with opposite ends of the cylinder.

In testimony that we claim the foregoing we have hereunto set our hands at Waukesha in the county of Waukesha and State of Wisconsin in the presence of two witnesses.

THOMAS DIAMOND.
WILLIAM P. DIAMOND.

Witnesses:
W. J. MURRAY,
T. H. ROACH.